No. 796,174. PATENTED AUG. 1, 1905.
R. BAGGALEY & C. M. ALLEN.
COPPER CONVERTER.
APPLICATION FILED NOV. 21, 1904.
2 SHEETS—SHEET 1.
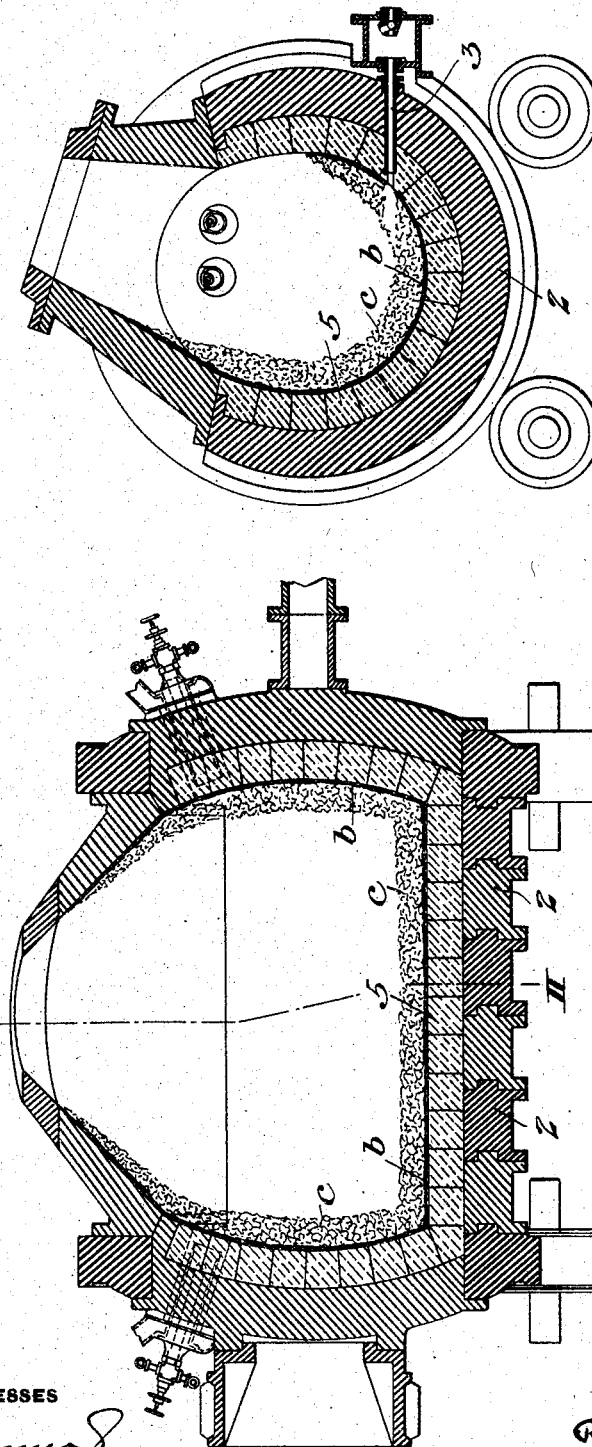

No. 796,174. PATENTED AUG. 1, 1905.
R. BAGGALEY & C. M. ALLEN.
COPPER CONVERTER.
APPLICATION FILED NOV. 21, 1904.
2 SHEETS—SHEET 2.
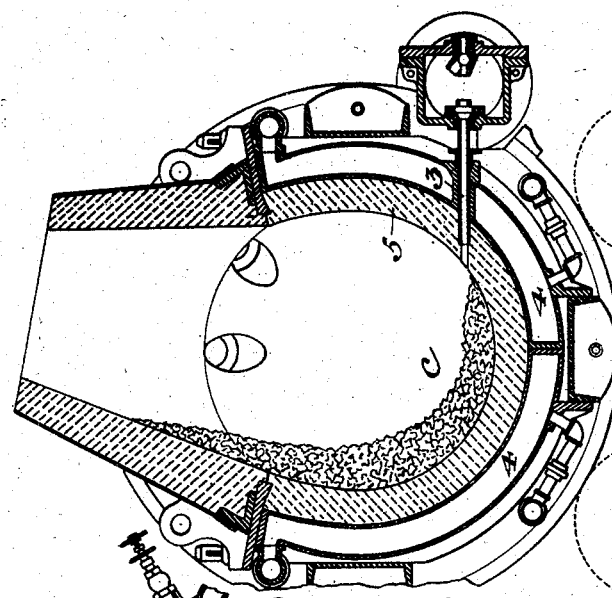
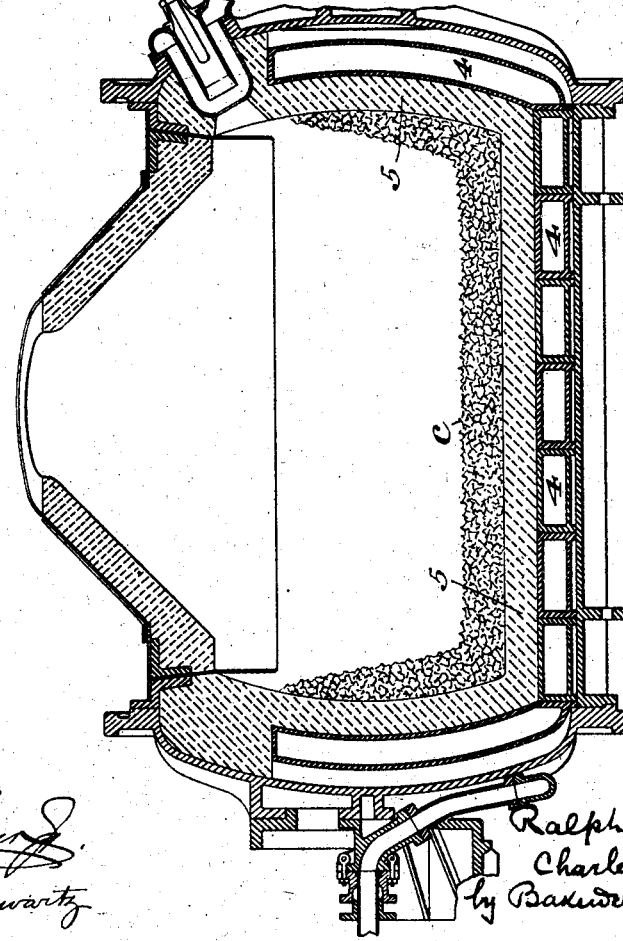
WITNESSES
INVENTORS
Ralph Baggaley
Charles M. Allen
by Bakewell Byrnes
their Attorneys.

UNITED STATES PATENT OFFICE.

RALPH BAGGALEY, OF PITTSBURG, PENNSYLVANIA, AND CHARLES M. ALLEN, OF LOLO, MONTANA; SAID ALLEN ASSIGNOR TO SAID BAGGALEY.

COPPER-CONVERTER.

No. 796,174.　　　Specification of Letters Patent.　　　Patented Aug. 1, 1905.

Application filed November 21, 1904. Serial No. 233,611.

*To all whom it may concern:*

Be it known that we, RALPH BAGGALEY, of the city of Pittsburg, in the county of Allegheny and State of Pennsylvania, and CHARLES M. ALLEN, of Lolo, in county of Missoula and State of Montana, have invented a new and useful Copper-Converter, of which the following is a full, clear, and exact description, reference being had to the accompanying drawings, forming part of this specification, in which—

Figure 1 is vertical longitudinal section of a converter embodying our invention. Fig. 2 is a vertical cross-section on the line II II of Fig. 1, and Figs. 3 and 4 are like views showing a modification.

The object of our invention is to reduce the cost of producing blister-copper by eliminating the present heavy expenses for converter-linings and to transform this serious expense into a source of profit, thus constituting a new method of converting mattes.

The apparatus which we prefer to use in practicing our invention is composed of heavy metal blocks whose thickness bears a proper relative proportion to the molten bath to be held, as fully explained in the application, Serial No. 200,943, filed March 31, 1904.

The water-jacketed converter (shown in Figs. 3 and 4) can be used in practicing this art; but we recommend that at the later stages of the process the flow of water through the jackets be greatly reduced or preferably shut off altogether for a time in order to prevent any excessive abstraction of heat from the vessel.

Many efforts have been made in the past to utilize mineral-bearing ores as the source of silica for fluxing the iron of copper matte after the latter has been oxidized by the converting-blast. As a rule these efforts have taken the form of the use of pulverized ores mixed with clay or some other bonding agent and water into a plastic mass, with which the converter is lined. In John Holway's patent, No. 234,129, dated November 9, 1880, a process is described wherein silicious and slag-producing materials are added to the matte. Metalliferous substances containing the necessary slag-producing materials and containing also valuable metals in such small quantities as to make them unfit for treatment by themselves were described as preferable. In actual work John Holway reported to the London Society of Arts that he used quartz-sand impregnated with about five per cent. of oxid of iron. He fed this with a shovel into the converter's mouth, but without success. Attempts have been made to supply silica or silicious ore in pulverized form by injecting it with the blast into the molten bath; but this process has not been successful. It has also been proposed to utilize ores that contained not less than eighty-five per cent. of silica and whose distinctive feature was silver values and to each ton of pulverized argentiferous quartz to add one hundred and seventy-five pounds of fire-clay with suitable proportions of water to make a plastic lining for the converter to flux the oxidized iron of the molten bath. This process has also remained to the present day unused. At Aguas Calientes a very unusual ore obtained from the St. Gertrude mine in Pachuca, Mexico, has been utilized as a successful converter-lining and fluxing agent. This ore contains approximately eighty per cent. of pure quartz, twenty per cent. of almost pure alumina, and from eight to fifteen dollars per ton in gold values, which latter are finely and evenly disseminated through the quartz. The ore is pulverized in Chilean mills, is then mixed with suitable proportions of water, and in this form it is rammed as a lining into very large converter-shells, usually to a thickness of about twenty-four inches. It has also been proposed, though without success, to feed white-hot silica into the mouth of the converter. In the process described in a patent of Ralph Baggaley, No. 746,241, dated December 8, 1903, cold silica in solid form was fed into the converter either on top of a clean body of molten converter-matte or, preferably, into an empty heated converter, where it was agglutinated by auxiliary heat, and thereafter the body of molten converter-matte was poured into the converter upon it. Ralph Baggaley's patent, No. 746,260, dated December 8, 1903, described a like process to that described in No. 746,241, except that it utilized mineral-bearing silicious ores as the fluxing material.

In all former efforts to use ore for converter-linings or to utilize either ore or silica by introducing it through the twyers or into the mouth of the converter the aim has been to satisfy the iron in a high-grade converter-matte and by this means to increase the percentage of the mineral contents, which would also have the effect of decreasing the volume of the molten bath correspondingly through the separation of slag. All such attempts to use ores for lining have been very costly, because such ores must be first pulverized, which in itself is very expensive, then thoroughly mixed with water and, with one exception, with clay, and thereafter they must be tamped or compacted into the converter-shell with rammers in order that they may remain firmly in position during the converting process. It has been found that the best results are obtained if only a moderate quantity of water be used; but in order to secure such comparatively dry plastic mixture in its position in the converter-shell a large amount of hand-labor has been required in the work of ramming it. This process has also required the expenditure of money for coke with which to dry out the linings before use, and inasmuch as coke is always expensive in localities where copper ores are treated this has added materially to the cost. In actual practice it is found that only a small proportion of such lining can be used until the destructive action must cease, else the destruction of the metal converter-shell will quickly follow, inasmuch as the corrosive action of the bases is not and cannot be distributed evenly over the surface of such lining. On the contrary, the iron of the matte attacks the silica of the lining much more at some places than it does at others. Hence when it has weakened it at any one point to the extent that the metal shell becomes heated to a red heat further converting action must cease or serious and permanent injury to the shell will result. When a lining thus becomes weakened, it necessitates the removal of a large amount of the same in order to prepare the shell for relining, and the portion removed usually is so permeated with fusible material from the former charges that it is unfit to be used again for a lining material. It must be smelted as a means of recovering its contained values, which process involves additional expense. It is estimated that each converter-lining costs at least forty dollars. If carefully prepared, it may last for from seven to twelve blows, but if carelessly applied it may be destroyed in a single blow or in two or three blows. Under the most favorable circumstances a very large proportion of the material contained in each lining is useless for effective work, because the iron of the matte usually eats holes through certain portions of it, thus rendering the balance useless for fluxing purposes. The life of such a lining will be very largely governed by the care and the uniform ramming exercised by the workmen while placing it in position. The constant aim has been to make the lining as durable as possible as a measure of economy. This has led experimenters to avoid everything that would render the lining friable or easily dissolved by the molten bath, and it has therefore been considered necessary to avoid the use of all ores and all lining materials that carry basic elements or compounds, inasmuch as these would contribute to its rapid destruction. Every other consideration has been sacrificed in the effort to maintain the life of the lining to the utmost.

By our present invention we depart widely from prior practice, because we utilize as a fluxing agent ores that carry varying percentages of bases, sulfids, and basic compounds, and the presence of these hitherto-objectionable elements and compounds will materially contribute to the speed and to the success of the process and will augment the mineral values contained in the bath. We are enabled to add copper, iron, sulfids, gold, silver, and any matte-making elements or compounds by means of our lining, and any and all copper, gold, and silver thus contributed to the bath through the medium of our lining will add to the enrichment of the matte.

In practicing our invention we take a converter, such as shown in Figs. 1 and 2, made of thick metal blocks 2 and lined with a compact inner lining 5 of silica or silica bricks. We apply to the interior surface of this lining a body or coating $c$, of copper ores containing silica and containing also sulfids of iron, copper, &c., and preferably gold, silver, and matte-making elements or compounds. We prefer to apply this lining by distributing on the interior of the converter a coating of slag or matte in a liquid condition and then to apply the ore lining to the coated interior and to cause it to adhere thereto, after which it may, if desired, be cemented with another addition of slag or matte. The converter being in a heated condition, we run into it from a smelting-furnace, forehearth, or other convenient source a body of molten slag, preferably enough to equal in volume one-half the usual converter charge, or we may use for this purpose some molten matte. We then tip the converter back and forth on its axis, so as to distribute this slag or matte over the interior surface in a sticky layer $b$, and we then tip the converter completely to discharge the surplus. The body of ore is then added to the converter, and by rocking the latter back and forth it is tumbled over the layer $b$ and caused to adhere thereto in a layer $c$, or, if desired, the ore may be spread over the converter with a shovel or otherwise. A small quantity of molten matte or slag is then preferably poured into the converter and being distributed in like manner over the lining completes the bonding of the ore particles. The slag or matte quickly sets, and, if desired, this setting can be hastened by blowing air thereon from the twyers 3. The ore is thus held to the converter with sufficient security to serve as a lining and to supply the flux to the charge beneath the bath; but being open and unpacked the lining acts more readily and causes the converting operation to proceed more quickly than is possible with linings heretofore employed.

Instead of first distributing a layer of molten matte or slag over the converter before applying the lining material we may place such material in the converter and cause it to adhere thereto by pouring upon it a small volume of molten slag or matte, or the unpacked lining material may be applied in other ways.

The lining may be constituted by selecting such ores as contain a sufficient quantity of flux, such as oxids or sulfids, to enable the lining to be centered in place by the application of external heat from oil-burners or the like.

Instead of using a converter made of metal blocks, as shown in Figs. 1 and 2, we may employ the converter shown in Figs. 3 and 4, having an exterior water-jacket 4 and an interior compact lining 5, of silica or silica bricks, within which the layer c of ore is applied. Other kinds of converter-shell may also be used. We show in all these figures burners 7 for supplying flame by which the ore lining may be centered in place. These burners may be omitted when the ore body is cemented to the interior walls by molten matte or slag.

The quantity of ore employed as lining material is selected with reference to the composition of the matte to be treated. It should contain sufficient silica to flux all the ore contained in the matte that is delivered into the converter, as well as the additions thereto supplied by the fusing of the matte-making compounds introduced with the ore.

In the converting process as conducted by us in a converter having a compact silica lining within which the body of ore is applied the bath will attack the uncompacted lining of ore so much more rapidly than it can attack the compacted silica that the latter will not be quickly destroyed.

We claim—

A copper-converter having a compacted silica lining and an interior lining of unpacked material containing ore; substantially as described.

In testimony whereof we have hereunto set our hands.

RALPH BAGGALEY.
CHARLES M. ALLEN.

Witnesses:
WILLIAM M. KIRKPATRICK,
AZELLE E. HOBART.